| United States Patent [19] | [11] Patent Number: 4,636,551 |
|---|---|
| Okaya et al. | [45] Date of Patent: Jan. 13, 1987 |

[54] COATING MATERIAL

[75] Inventors: Takuji Okaya, Nagaokakyo; Yoshinari Tanaka; Kiyoshi Yonezu, both of Kurashiki; Akimasa Aoyama; Takeshi Moritani, both of Kurashiki, all of Japan

[73] Assignee: Kuraray Co, Ltd., Kurashiki, Japan

[21] Appl. No.: 738,831

[22] Filed: May 29, 1985

[30] Foreign Application Priority Data

Jun. 8, 1984 [JP] Japan .................. 59-118767

[51] Int. Cl.$^4$ ............................................. C08F 16/06
[52] U.S. Cl. ...................................... 525/60; 526/304; 526/331
[58] Field of Search ........................... 525/60; 526/304

[56] References Cited

U.S. PATENT DOCUMENTS

| 3,560,461 | 2/1971 | Yonezu et al. | 525/60 |
|---|---|---|---|
| 4,097,436 | 6/1978 | Buning et al. | 525/60 |
| 4,219,591 | 8/1980 | Buning et al. | 525/60 |
| 4,264,746 | 4/1981 | Pritchett | 525/60 |

FOREIGN PATENT DOCUMENTS

| 7248489-R | 1/1968 | Japan | 525/60 |
|---|---|---|---|
| 7129489-R | 9/1968 | Japan | 525/60 |
| 9059885 | 6/1974 | Japan | 525/60 |
| 0088075 | 8/1978 | Japan | 525/60 |
| 0027774 | 2/1983 | Japan | 525/60 |
| 0079003 | 5/1983 | Japan | 525/60 |
| 0080304 | 5/1983 | Japan | 525/60 |
| 0111850 | 7/1983 | Japan | 525/60 |
| 0164604 | 9/1983 | Japan | 525/60 |

*Primary Examiner*—Joseph L. Schofer
*Assistant Examiner*—J. M. Reddick
*Attorney, Agent, or Firm*—Kramer and Brufsky

[57] ABSTRACT

There is provided a coating material made of a saponification product of a modified ethylene-vinyl acetate copolymer containing a cross-linkable olefinically unsaturated monomer. The saponification product is characterized by its intrinsic viscosity not greater than 0.7 dl/g which is measured at 20° C. using phenol containing 15 wt % of water as a solvent. This polymer is readily soluble in solvents, and the resulting solution can have concentration as high as 20 to 50 wt % and provide coating film which is as strong as that obtained from the conventional EVOH having a high degree of polymerization.

3 Claims, No Drawings

COATING MATERIAL

BACKGROUND OF THE INVENTION

1. Field of the Invention

The present invention relates to a coating material comprising a saponification product of modified ethylene-vinyl acetate copolymer. The coating material affords a coating film which increases in strength upon heating. The copolymer contains as a third component olefinically unsaturated monomers capable of cross-linking. The saponification product is readily soluble in solvents and has an intrinsic viscosity (abbreviated as [$\eta$] hereinafter) not greater than 0.7 dl/g which is measured at 20° C. using phenol containing 15 wt% of water as a solvent.

2. Description of the Prior Art

The saponification product of ethylene-vinyl acetate copolymer (abbreviated as EVOH hereinafter) is a useful polymeric material superior in gas barrier properties, clarity, oil resistance, and keeping of fragrance. On account of these characteristic properties, it finds broad applications as film, sheet, and containers. It is also used in the form of solution to coat the surface of film, sheet, or containers made of a variety of resins. The coating of EVOH improves the film, sheet, and containers in oil resistance and gas barrier properties. In order for the coating of EVOH to have sufficient strength, EVOH should have a certain degree of polymerization, or have an intrinsic viscosity greater than 0.7 dl/g, preferably greater than 0.9 dl/g. On the other hand, EVOH having such a high intrinsic viscosity yields highly viscous solutions when dissolved in a solvent in high concentrations even though the coating solution of high concentration is economically advantageous. Thus the resin concentration of the coating solution is limited to about 15% at the highest from the standpoint of workability. This limited concentration makes it necessary to repeat the coating operation until a desired coating thickness is obtained, and the repeated coating is uneconomic from the standpoint of solvent recovery.

Japanese Patent Laid-open No. 123189/1975 (counterpart of U.S. Pat. No. 4097436) discloses a process for producing silicon-containing polyvinyl alcohol by copolymerizing vinyl acetate with vinyl alkoxysilane and subsequently saponifying the resulting copolymer. It also discloses that a portion (30 to 40 wt%) of the vinyl acetate used for the copolymerization can be replaced by other comonomer (such as ethylene). It further discloses that an aqueous solution of the modified polyvinyl alcohol can be used as a coating material for inorganic silicate substrates. However, it gives no description about silicon-modified EVOH containing 25 to 55 mol% of ethylene and the use of this polymer as a coating material in the form of solution in a mixed solvent of water and organic solvent.

Japanese Patent Laid-open No. 76403/1983 discloses a process for producing a modified polyvinyl alcohol having cross-linkable groups by copolymerizing vinyl acetate with N-alkoxymethyl(meth)acrylamide. It also discloses that the copolymerization is possible for other comonomer such as ethylene in an amount less than 10 mol%. However, it gives no description about EVOH containing 25 to 55 mol% of ethylene and having cross-linkable groups.

Japanese Patent Publication No. 48489/1972 discloses the use of EVOH as a coating material in the form of solution in a mixed solvent of water and organic solvent (such as n-propyl alcohol). However, it gives no description about the modification of EVOH with cross-linkable monomers and the low-molecular weight EVOH having an intrinsic viscosity lower than 0.7 dl/g.

SUMMARY OF THE INVENTION

The present inventors carried out a series of researches which led to the findings that the modified EVOH obtained by saponifying a copolymer composed of vinyl acetate, ethylene, and, as a third component, cross-linkable olefinically unsaturated monomer affords a coating material in the form of solution of economically high concentrations and low viscosity for good workability, and that the coating material forms a coating film which increases in strength upon post heat treatment. The present invention is based on these findings.

The modified EVOH according to this invention has an intrinsic viscosity not greater than 0.7 dl/g and is readily soluble in solvents. The solvent solution of the resin has a low viscosity even though its concentration is high, and provides a coating film which increases in strength upon post heat treatment. Coating film thus formed is superior in gas barrier properties, oil resistance, keeping of fragrance, and clarity.

DESCRIPTION OF THE PREFERRED EMBODIMENTS

The modified EVOH used for the coating material of this invention is defined by the ethylene content which is 20 to 55 mol%, most suitably 25 to 55 mol%, and the degree of saponification of the vinyl acetate component in the copolymer which is at least 95%. If the ethylene content is lower than 20 mol%, the resulting coating film is poor in resistance to cold and hot water, and if it is greater than 55 mol%, the resulting coating film is poor in gas barrier properties and keeping of fragrance. If the degree of saponification is lower than 95%, the resulting coating film is poor in gas barrier properties and oil resistance which are characteristic of EVOH.

The olefinically unsaturated monomer used as a third component in this invention is one or more than one kind selected from cross-linkable compounds. Preferred ones are selected from the compounds represented by the following formulas [I] and [II].

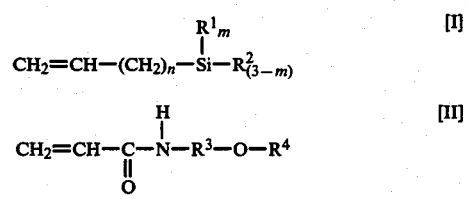

where n is 0 or 1; m is 0 to 2; $R^1$ is a lower alkyl group or aryl group, or a lower alkyl group having an aryl group; $R^2$ is a $C_1$–$C_{40}$ saturated branched or unbranched alkoxy group; $R^3$ is a lower alkylene group; and $R^4$ is a $C_1$–$C_{40}$ saturated branched or unbranched alkyl group. (Preferably, $R^1$ should be a $C_1$–$C_5$ lower alkyl group, a $C_6$–$C_{18}$ aryl group, or a $C_1$–$C_5$ lower alkyl group having a $C_6$–$C_{18}$ aryl group; and $R^3$ is a $C_1$–$C_5$ lower alkylene group.)

Examples of the olefinically unsaturated monomer represented by the formula [I] include vinyltrimethoxysilane, vinylmethyldimethoxysilane, vinyldimethylmethoxysilane, vinyltriethoxysilane, vinylmethyldiethoxysilane, vinyldimethylethoxysilane, allyltrimethoxysilane, and allylmethyldimethoxysilane. Preferable among them is vinyltrimethoxysilane.

Examples of the olefinically unsaturated monomer represented by the formula [II] include N-methoxymethylacrylamide*, N-methoxyethylacrylamide, N-ethoxymethylacrylamide, N-(n-propoxymethyl)acrylamide, N-(isopropoxy)acrylamide, and N-(n-butoxymethyl)acrylamide. Preferable among them is N-(n-butoxymethyl)acrylamide.

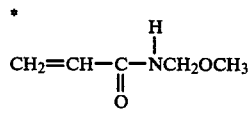

Additional examples of the cross-linkable olefinically unsaturated monomer include glycidyl acrylates represented by the formula below:

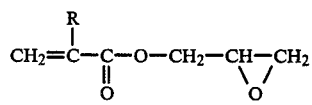

and acrylic acids (or esters) represented by the formula below:

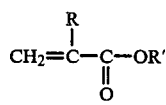

(where R is hydrogen or a methyl group, and R' is hydrogen or a $C_1$-$C_{20}$ saturated branched or unbranched alkyl group.) Those compounds represented by the formula [I] are preferable among the cross-linkable olefinically unsaturated monomers.

The copolymerization of vinyl acetate, ethylene, and cross-linkable olefinically unsaturated monomer should preferably be performed by solution polymerization in the presence of alcohol. This alcohol is usually a lower alcohol such as methanol, ethanol, and butanol. The essential condition for the modified EVOH of this invention is that it should have an intrinsic viscosity not greater than 0.7 dl/g, preferably 0.7 to 0.3 dl/g, and most suitably 0.6 to 0.3 dl/g. Methanol is preferable because of its great constant of chain transfer and its commercial availability at low price. When occasion demands, it is possible to adjust the intrinsic viscosity by adding a more potent chain transfer agent such as mercaptan and aldehyde.

The copolymerization can be performed batchwise or continuously. The content of ethylene in EVOH depends chiefly on the amount of vinyl acetate present in the copolymerization system and the amount of dissolved ethylene. The latter depends chiefly on the ethylene pressure and temperature in the polymerization vessel. If the ethylene content is the same, the extent of modification of the modified EVOH is governed by the quantitative relation between vinyl acetate and olefinically unsaturated monomer present in the system.

In the case of batchwise copolymerization, the rate of polymerization and the composition of copolymerizate vary with the reactivity ratio of comonomers. This is a well-known fact. In order to produce a copolymer of uniform composition, the semi-batchwise process is preferable in which one or two monomers are added time to time so that the monomer composition is kept constant. The amount of monomer to be added may be calculated according to the formula proposed by R. J. Hanna. (Industrial and Engineering Chemistry, Vol. 49, No. 2, 208–209 (1957).

In the case of continuous process, the single-stage flow system of complete mixing type is preferable which employs a stirred mixing tank as the polymerizer. Where the two-stage or multi-stage flow system is employed, monomers should be added to the second and succeeding tanks so that the monomer composition in the polymerizer is kept constant in each stage.

The polymerization initiator that can be used in this invention is any known free-radical initiator, which include nitriles such as 2,2-azobis-(4-methoxy-2,4-dimethylvaleronitrile), and 2,4,4-trimethylvaleronitrile; carbonates such as di-n-propyl peroxycarbonate, and bis-4-t-butylcyclohexyl peroxydicarbonate; and peroxides such as acetylcyclohexane sulfonyl peroxide, benzyl peroxide, and lauroyl peroxide.

The content of the olefinically unsaturated monomer as a third component should be 0.0005 to 5 mol%, preferably 0.001 to 3 mol%, more preferably 0.01 to 3 mol%, and most suitably 0.05 to 3 mol%. If it is too small, the effect of modification is not produced; and if it is too large, the resulting copolymer is poor in uniform solubility and oxygen barrier properties which are characteristic of EVOH. It should be properly selected according to the intended use and the type of monomer.

The copolymer obtained as mentioned above is subsequently subjected to saponification reaction. This reaction may be advantageously carried out by the known method that employs an alkaline catalyst. Usually the copolymer undergoes alcoholysis in an alcohol solution. The preferred process for saponification is disclosed in Japanese Pat. Nos. 575,889 and 611,557. According to this process, reaction is performed in a column type reactor by blowing alcohol vapor into the bottom of the column so as to remove methyl acetate formed by saponification from the top of the column.

The alkaline catalyst used for saponification is an alkali metal hydroxide such as sodium hydroxide and potassium hydroxide, and an alcoholate such as sodium methylate and potassium methylate. Sodium hydroxide is economically advantageous for operation on an industrial scale.

The saponification temperature is 60° to 175° C. Where a column type reactor is employed, temperatures higher than 100° C. are desirable for the reduction of reaction time and the solubility of the modified EVOH toward alcohols, although they vary depending on the composition of the copolymer.

After the saponification reaction, the modified EVOH is separated by the known method. The one disclosed in Japanese Pat. No. 725,520 is preferable. According to this method, the modified EVOH is separated in the form of strand. The modified EVOH thus separated is washed with water and, if necessary, is treated with an acid for heat stabilization, followed by drying, according to the known method. Finally, the modified EVOH is dissolved in a solvent to give a coating solution. This coating solution is incorporated with a cross-linking catalyst, if necessary. In the case where a water-alcohol solvent is used, the washed EVOH may be dissolved in the solvent while it is still wet or half dried. This is economically preferable.

The solvent used to make the coating solution of this invention includes dimethyl sulfoxide, dimethylformamide, and aliphatic alcohols of carbon number 4 or less such as methanol, ethanol, isopropyl alcohols, and butyl alcohols. They may be used alone or in combination with water. An alcohol-water solvent is preferred for solubility, dissolving temperature, volatility (drying speed), and economy. Preferred examples of the alcohol-water solvent are mixtures of one or more than one alcohol selected from n-propyl alcohol, iso-propyl alcohol, n-butyl alcohol, sec-butyl alcohol, and t-butyl alcohol with water. The composition of the alcohol-water solvent depends on the solubility and the stability of the solution. Usually the alcohol content is greater than 50 wt%, depending on the type of alcohol and the ethylene content in the modified EVOH. For example, 65 to 75 wt% of n-propyl alcohol is preferred for modified EVOH containing 43 mol% of ethylene, and 50 to 65 wt% of n-propyl alcohol is preferred for modified EVOH containing 33 mol% of ethylene.

The solubility of the modified EVOH of this invention is not so different from that of the known EVOH resin, because the content of a third component is small even though it is modified. Therefore, the type and composition of the solvent may be properly selected in the light of known data on the solubility of ordinary EVOH resins (as described in Japanese Patent Publication No. 48489/1972).

The resin content in the coating solution should preferably be 20 to 50 wt%, particularly 25 to 40 wt%. This is extremely advantageous from the standpoint of economy and workability, in contrast with the conventional EVOH coating solution having a resin content of 15 wt% at the highest.

The coating solution is incorporated with a cross-linking catalyst, if necessary. It is properly selected according to the type and content of the cross-linkable monomer as a third component. Preferred examples are inorganic acids such as sulfuric acid and phosphoric acid, organic acids such as acetic acid, oxalic acid, and succinic acid, acid anhydrides such as phthalic anhydride, and ammonium salts of strong acids such as ammonium chloride and ammonium sulfate.

The coating solution prepared as mentioned above is applied to the substrate by casting, roll coating, doctor roll coating, doctor knife coating, curtain flow coating, spraying, dipping, or brushing. The coating film formed on the substrate is dried and, if necessary, heat treated. The temperature and time of heat treatment should be properly adjusted according to the type and content of the cross-linkable monomer as a third component and also according to the intended use of the coating film. Usually the heat treatment is performed at 100° to 180° C. for 1 hour or less. The drying process and heat treatment promote cross-linking to give the coating film having a practically high strength.

The invention is now described in more detail with reference to the following examples, in which parts by weight and percent (%) means parts by weight and percent by weight (wt%), respectively, unless otherwise specified.

EXAMPLE 1

A modified ethylene-vinyl acetate copolymer was prepared by continuous polymerization under the following conditions using a 10-liter polymerization vessel equipped with an internal cooling coil and stirrer.

Feed rate of vinyl acetate: 390 g/hr
Feed rate of methanol: 390 g/hr
Feed rate of 2,2'-azobis-(2,4-dimethylvaleronitrile): 160 mg/hr
Feed rate of vinyltrimethoxysilane: 650 mg/hr
Polymerization temperature: 60° C.
Average residence time: 6.5 hours
Ethylene pressure in polymerization vessel: 28 kg/cm$^2$G The rate of polymerization of vinyl acetate was about 40%. The NMR analysis indicated that the resulting copolymer contains 0.11 mol% of vinyltrimethoxysilane, 68 mol% of vinyl acetate units, and 32 mol% of ethylene units.

The copolymer underwent saponification reaction as follows: The methanol solution of the copolymer was admitted into a column type saponification reactor. Sodium hydroxide was supplied to the reactor in such an amount that the molar ratio of sodium hydroxide to vinyl acetate unit in the copolymer is 0.04. During the saponification reaction, methanol vapor was blown into the bottom of the column to remove methyl acetate which is formed by saponification from the top of the column. Thus there was obtained a methanol solution of modified EVOH from the bottom of the column.

Steam was blown into this methanol solution to convert the solvent of the solution into a water/methanol mixed solvent. The solution was discharged in the form of strand into a 10% aqueous solution of methanol at 5° C. After solidification, the strand was cut into pellets. The pellets were thoroughly washed and then dipped in an aqueous solution of acetic acid (1.6 g/liter) for 3 hours, followed by drying at 50° C. Thus there was obtained modified EVOH in the form of pellets containing 50% of volatile matter. This modified EVOH had a degree of saponification of 99.4% and an intrinsic viscosity of 0.55 dl/g.

The pellets of the modified EVOH were dissolved in a mixed solvent of n-propanol and water to give a coating solution composed of 55 parts of solvent and 45 parts of modified EVOH. This coating solution had a viscosity of 400 cp as measured by a Brookfield viscometer at 40° C.

The coating solution was applied, by using a coater, onto a 20-μm thick corona-treated and primed OPP film. (The priming was performed by applying a polyurethane adhesive for dry lamination at a loading of 2 g/m$^2$, followed by drying at 120° C. for 20 seconds.) The application of the coating solution was carried out at 40° C., followed by drying at 110° C. for 2 minutes and subsequent heat treatment at 145° C. for 5 minutes. Thus there was obtained an 8-μm thick, uniform transparent coating film of the modified EVOH.

Apart from the application onto a substrate, the coating solution was made into an 8-μm thick cast film, which was dried and heat treated in the same manner as mentioned above. This cast film was examined for tensile strength at break at 20° C. and 65% RH. The tensile strength was 4.5 kg/mm$^2$, which is high enough for practical use.

COMPARATIVE EXAMPLE 1

An 8-μm thick cast film was prepared in the same manner as in Example 1 except that the modified EVOH was replaced by the conventional EVOH (ethylene content: 32 mol%, degree of saponification: 99.4%, and [η]: 0.55 dl/g). It was so brittle that the measurement of strength was impossible.

COMPARATIVE EXAMPLE 2

Two coating solutions each containing 15% EVOH and 30% EVOH in a 55/45 mixed solvent of n-propanol and water were prepared in the same manner as in Example 1 except that the modified EVOH was replaced by the conventional EVOH (ethylene content: 32 mol%, degree of saponification: 99.4%, and [$\eta$]: 1.0 dl/g). Their viscosity at 40° C. was 800 cp and 75000 cp, respectively. The 30% solution had such a high viscosity that it was useless as a coating solution. The 15% solution was made into an 8-$\mu$m thick cast film, which was dried and heat treated int the same manner as in Example 1. This cast film was examined for tensile strength at break at 20° C. and 65% RH. The tensile strength was 4.8 kg/mm$^2$.

EXAMPLE 2

A modified ethylene-vinyl acetate copolymer was prepared by continuous polymerization under the following conditions using the same polymerization vessel as in Example 1.

Feed rate of vinyl acetate: 340 g/hr
Feed rate of methanol: 395 g/hr
Feed rate of 2,2'-azobisisobutyronitrile: 160 mg/hr
Feed rate of N-(n-butoxymethyl)acrylamide: 650 mg/hr
Polymerization temperature: 60° C.
Average residence time: 8 hours
Ethylene pressure in polymerization vessel: 27 kg/cm$^2$G The rate of polymerization of vinyl acetate was about 45%. The NMR analysis indicated that the resulting copolymer contains 2 mol% of N-(n-butoxymethyl)acrylamide, 65 mol% of vinyl acetate units, and 33 mol% of ethylene units.

The copolymer underwent saponification reaction, followed by separation and water washing, in the same way as in Example 1. Thus there was obtained modified EVOH in the form of pellets having a degree of saponification of 99.3% and an intrinsic viscosity of 0.52 dl/g.

The pellets of the modified EVOH were dissolved in a mixed solvent of n-propanol and water to give a coating solution containing 35% of modified EVOH and 0.5% of ammonium chloride in a 50/50 mixed solvent of n-propanol and water. This coating solution had a viscosity of 900 cp at 50° C.

The coating solution was applied, by dipping, onto a 1-liter bottle with a wall thickness of 200 $\mu$m made by blow molding from polyethylene terephthalate resin of 0.75 dl/g. (The bottle had previously been primed with a 10-$\mu$m thick coating of polyurethane adhesive.) After dipping, the coating solution was dried at 90° C. for 3 minutes and then heat treated at 150° C. for 2 minutes. Thus there was obtained a 12-$\mu$m thick, uniform transparent coating film of the modified EVOH.

Apart from the application onto a substrate, the coating solution was made into a 12-$\mu$m thick cast film, which was dried and heat treated in the same manner as mentioned above. This cast film was examined for tensile strength at break at 20° C. and 65% RH. The tensile strength was 4.0 kg/mm$^2$.

COMPARATIVE EXAMPLE 3

A 12-$\mu$m thick cast film was prepared in the same manner as in Example 2 except that the modified EVOH was replaced by the conventional EVOH (ethylene content: 33 mol%, degree of saponification: 99.3%, and [$\eta$]: 0.52 dl/g). It was too brittle to be separated, and the measurement of strength was impossible.

EXAMPLES 3 to 5 and COMPARATIVE EXAMPLES 4 to 7

Various kinds of modified EVOH as shown in Table 1 were prepared. Each of them was dissolved in a mixed solvent of alcohol and water, and the resulting solution was applied to a 20-$\mu$m thick OPP film in the same manner as in Example 1, followed by heat treatment. There was obtained uniform transparent coating film having sufficient strength for practical use.

In contrast, the coating solution made from unmodified EVOH provided coating film which was too weak for practical use. In Comparative Example 7, the modified EVOH containing 6 mol% of vinyltrimethoxysilane was insoluble in the alcohol/water mixed solvent.

TABLE 1

| | EVOH | | | | | Coating film | |
|---|---|---|---|---|---|---|---|
| | Ethylene content (mol %) | Modifying third component | | [$\eta$] (dl/g) | Viscosity of 30% solution (cp)** | Heat treatment | Tensile strength at break* (kg/mm$^2$) |
| | | Name of compound | content (mol %) | | | | |
| Example 3 | 29 | Vinyltrimethoxysilane | 0.08 | 0.45 | IPA/water (5/5) 280 | 110° C., 2 min 140° C., 10 min | 3.5 |
| Example 4 | 38 | Vinylmethyldimethoxy-silane | 0.25 | 0.47 | NPA/water (6/4) 580 | 90° C., 1 min 145° C., 5 min | 3.0 |
| Example 5 | 44 | Vinyltriethoxysilane | 0.15 | 0.51 | NPA/water (7/3) 640 | 90° C., 1 min 130° C., 30 min | 2.6 |
| Comparative Example 4 | 29 | none | | 0.45 | IPA/water (5/5) 220 | 110° C., 2 min 140° C., 10 min | 0 |
| Comparative Example 5 | 38 | none | | 0.47 | NPA/water (6/4) 420 | 90° C., 1 min 145° C., 5 min | 0 |
| Comparative Example 6 | 44 | none | | 0.51 | NPA/water (7/3) 550 | 90° C., 1 min 130° C., 30 min | 0.2 |
| Comparative Example 7 | 44 | Vinyltrimethoxysilane | 6.0 | 0.60 | NPA/water (7/3) insoluble | — | — |

*Measured at 20° C., 65% RH.
**Measured at 50° C. with a Brookfield viscometer.
IPA: Isopropyl alcohol,
NPA: n-propyl alcohol.

EXAMPLES 6 to 12

Various kinds of modified EVOH as shown in Table 2 were prepared. Each of them was dissolved in a mixed solvent of alcohol and water, and the resulting solution was incorporated with a cross-linking catalyst, if necessary. The coating solution was applied to a 20-μm thick OPP film in the same manner as in Example 1, followed by heat treatment. There was obtained uniform transparent coating film having sufficient strength for practical use as shown in Table 2.

TABLE 2

| | Modified EVOH | | | | Cross-linking catalyst | | Viscosity of 30% solution (cp)** | Coating film | |
|---|---|---|---|---|---|---|---|---|---|
| Example | Ethylene content (mol %) | Modifying third component | | | | | | | |
| | | Compound name | Content (mol %) | [η] (dl/g) | Compound | Amount added (%)* | | Conditions of heat treatment | Tensile*** strength at break (kg/mm²) |
| 6 | 31 | N—ethoxymethyl-acrylamide | 1.5 | 0.57 | Ammonium chloride | 0.7 | NPA/water (5/5) 800 | 100° C., 2 min 140° C., 5 min | 4.0 |
| 7 | 40 | N—(n-propoxymethyl)acrylamide | 3.0 | 0.48 | Ammonium chloride | 0.5 | NPA/water (7/3) 450 | 90° C., 2 min 140° C., 4 min | 3.2 |
| 8 | 33 | N—methoxyethyl-acrylamide | 2.5 | 0.52 | Ammonium chloride | 0.5 | NPA/water (55/45) 600 | 100° C., 2 min 140° C., 4 min | 4.5 |
| 9 | 44 | Glycidyl methacrylate/methacrylic acid | 0.5/ 0.5 | 0.45 | Phosphoric acid | 0.2 | IPA/water (7/3) 350 | 90° C., 1 min 120° C., 2 min | 3.5 |
| 10 | 38 | Methacrylic acid | 0.4 | 0.55 | Sulfuric acid | 0.02 | IPA/water (6/4) 780 | 90° C., 1 min 110° C., 3 min | 3.0 |
| 11 | 32 | Glycidyl acrylate/ acrylic acid | 0.3/ 0.5 | 0.40 | Phosphoric acid | 0.2 | NPA/water (5/5) 150 | 80° C., 2 min 110° C., 3 min | 4.0 |
| 12 | 48 | Methyl acrylate | 0.8 | 0.38 | none | — | IPA/water (7/3) 180 | 80° C., 2 min 130° C., 5 min | 2.4 |

*Concentration in 30% coating solution of modified EVOH.
**Measured at 50° C. with a Brookfield viscometer.
***Measured at 200° C. and 65% RH.
IPA: isopropyl alcohol,
NPA: n-propyl alcohol.

What is claimed is:

1. A saponification product of a modified ethylene-vinyl acetate copolymer which comprises vinyl acetate, ethylene and a cross-linkable olefinically unsaturated monomer having the formula:

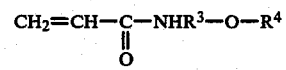

in which $R^3$ is $C_1-C_5$ alkylene, and $R^4$ is $C_1-C_{40}$ saturated branched or unbranched alkyl, said saponification product having a degree of saponification of the vinyl acetate component of at least 95%, an ethylene content of from 20 to 55 mole %, a content of olefinically unsaturated monomer of from 0.0005 to 5 mole %, and an intrinsic viscosity not greater than 0.7 dl/g measured at 20° C. using phenol containing 15 wt % of water as a solvent.

2. A saponification product according to claim 1 in which the oleinically unsaturated monomer is selected from the group consisting of N-methoxymethylacrylamide, N-methoxyethylacrylamide, and N-ethoxymethylacrylamide, N-n-propoxymethylacrylamide, and N-n-butoxymethylacrylamide.

3. A saponification product according to claim 2 in which the olefinically unsaturated monomer is N-n-butoxymethylacrylamide.

* * * * *